June 7, 1938.    B. L. PETERSON    2,119,555
FISH LADDER ASSEMBLY
Filed May 25, 1937    5 Sheets-Sheet 2

INVENTOR
Ben L. Peterson,
BY
Adam Richmond
HIS ATTORNEY.

June 7, 1938.  B. L. PETERSON  2,119,555
FISH LADDER ASSEMBLY
Filed May 25, 1937  5 Sheets-Sheet 5

INVENTOR
Ben L. Peterson,
BY
Adam Richmond
HIS ATTORNEY.

Patented June 7, 1938

2,119,555

UNITED STATES PATENT OFFICE 2,119,555

FISH LADDER ASSEMBLY

Ben L. Peterson, Portland, Oreg., assignor to the Government of the United States of America, represented by the Secretary of War Application May 25, 1937, Serial No. 144,611

4 Claims. (Cl. 61—21)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to improved means for controlling the water level, quantity, and velocity through the upstream ends of fish ladders.

The invention is particularly adapted to fish ladders constructed to enable fish to proceed up rivers or streams obstructed by dams subject to considerable variation of forebay elevation. Many rivers, as those on the western coast of the United States, are spawning places of anadromous fish, such as salmon, whose habit it is to proceed upstream to the smaller tributaries where conditions are favorable for spawning. These rivers are likewise of such a nature as to provide abundant water flows for power, navigation, and/or irrigation purposes when adequately dammed. However, the nature of the terrain and of the meteorological conditions are frequently such that dams are required which provide for wide fluctuations of forebay elevation and present great difficulties to the upstream migration of fish.

In a majority of these rivers the rate of flow has a high seasonal variation. Consequently, the forebay or headwater elevation of the dam reservoir will vary accordingly and a suitable means of controlling the height of the water level at the upstream end of the fishway is of vital importance, in order that the rate of flow therethrough may be maintained as desired. In general, the amount of water diverted for fishway use should be held to as small a percentage of the available flow as possible, to conserve the water impounded by the dam; this can be accomplished by control of the flow through the fishway. For the successful passage of fish through a fishway it is necessary that the rate of flow of water therethrough in general be maintained within the limits lying between a minimum flow sufficient to lure fish into the fishway and a maximum beyond which the fish experience difficulty in ascending the fishway.

With that heretofore recited in view, it is the object of the present invention to provide means for maintaining a desired hydraulic gradient in that portion of a fish ladder lying within the range of variations of forebay elevations.

Another object of the invention is to provide means whereby the rate of flow of water through a fish ladder may be controlled.

A still further object of the invention is the provision of means whereby submerged openings through the upper weirs of a fish ladder may be effected, the areas and positions of which may be varied within the scope of the construction.

It is also an object of the invention to provide means for draining the fishway to facilitate inspection, cleaning, and/or repairs.

Other objects and objects relating to the details of construction, combination and arrangement of parts will hereinafter appear in the description to follow.

Referring more particularly to the accompanying drawings in which corresponding parts are indicated by similar reference characters:

Figure 1:
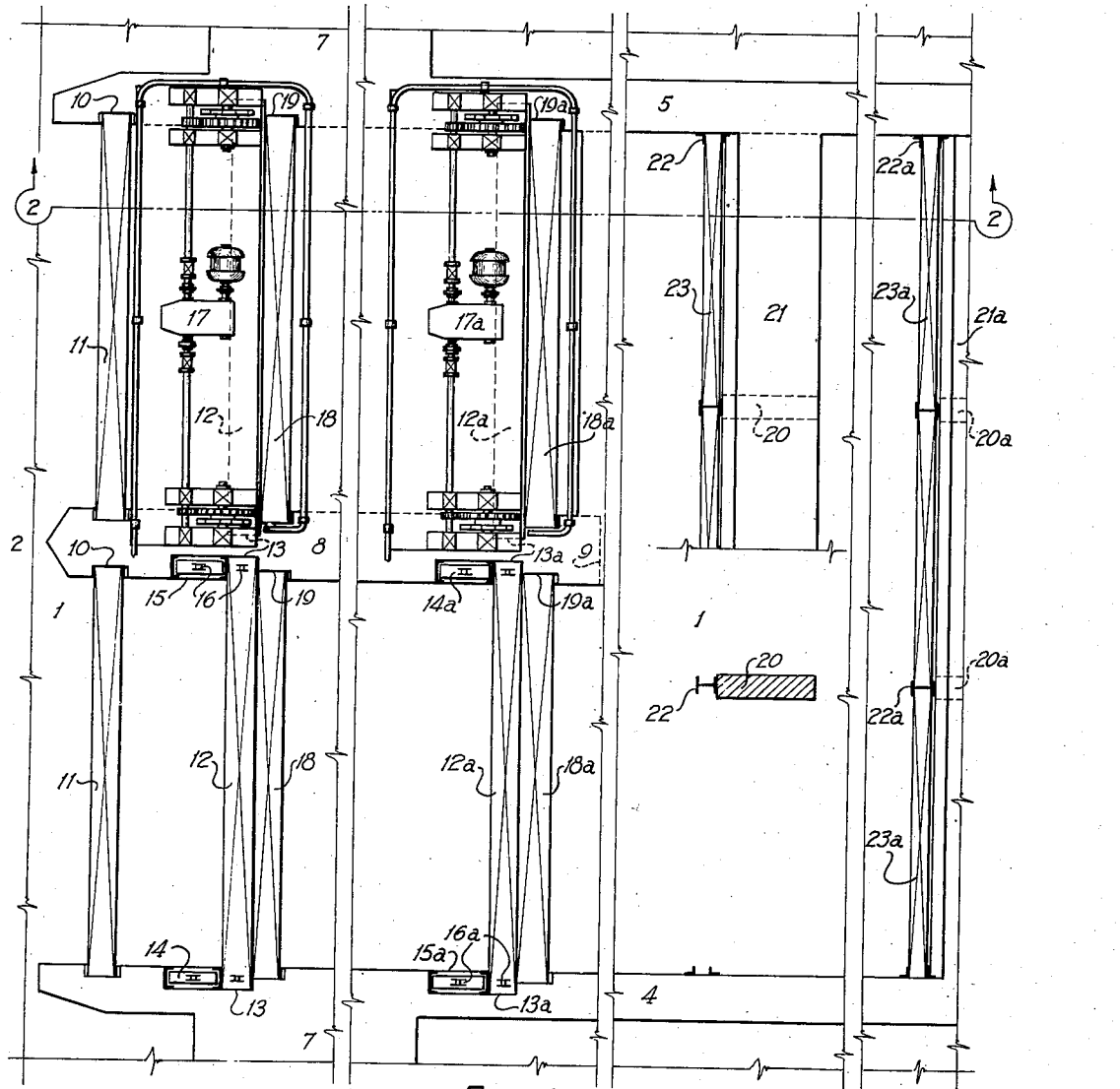
Figure 1 is a plan view of the apparatus of the present invention incorporated in a preferred construction of a fishway. This view is shown with the machinery, driveways, etc., omitted from a portion of the device, to more readily disclose the construction and arrangement of the various parts.
Figure 2:
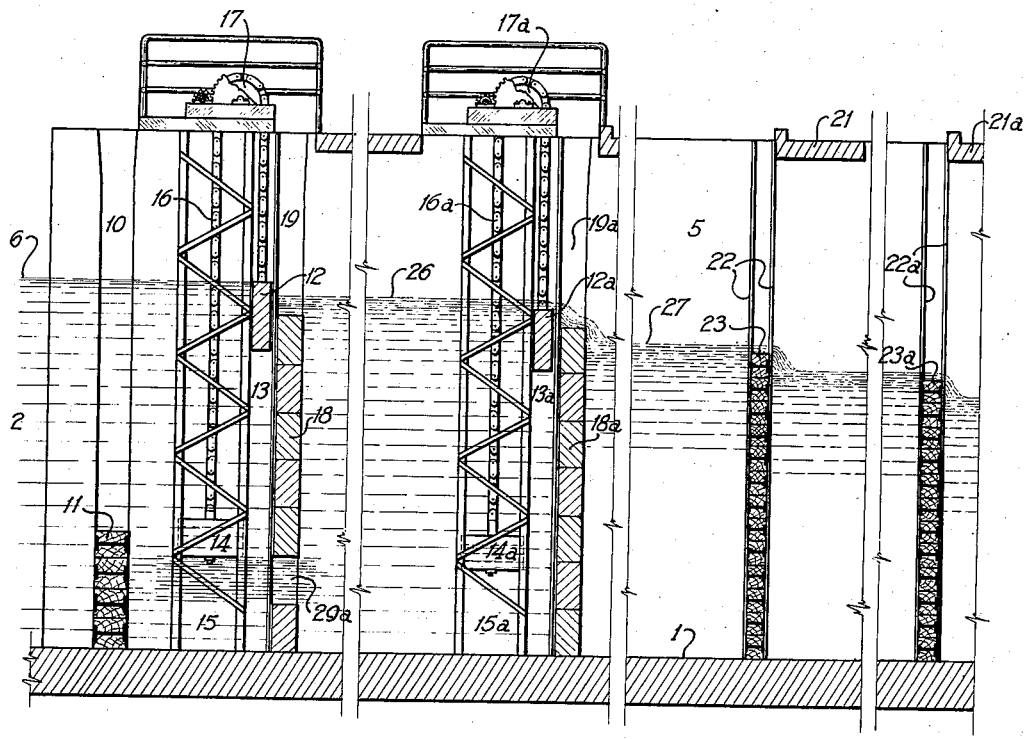
Figure 2 is a vertical section of Figure 1 taken substantially on line 2—2 and in the direction indicated.
Figure 3:
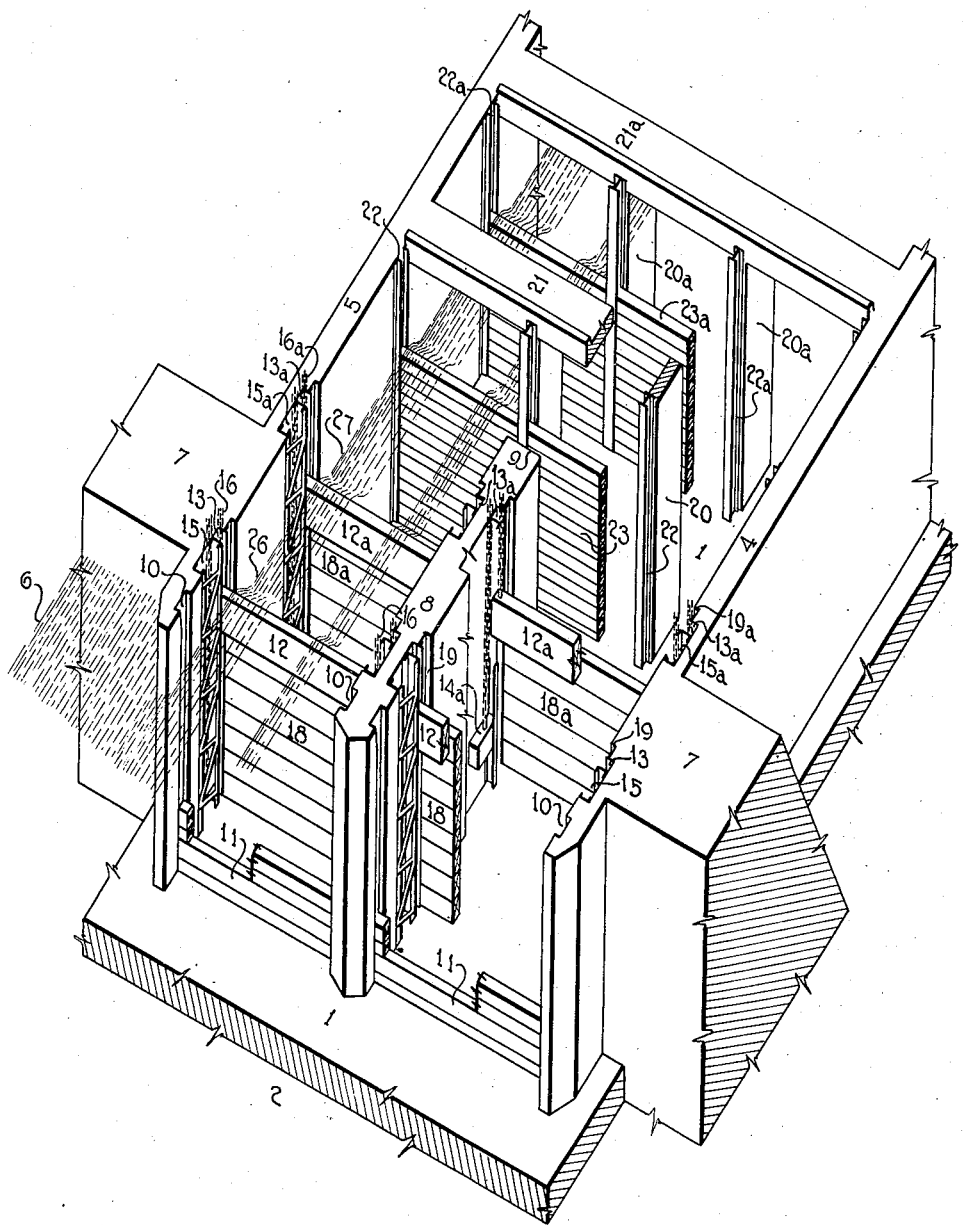
Figure 3 is an oblique projection of the invention in which machinery, machinery supports, etc., have been omitted and portions of the construction broken away to clarify the construction and operation of the device.

The device comprises a floor (1), substantially level at its upstream end (2) and for some distance therebelow, then dropping by a suitable gradient to its downstream end (3). Walls (4) and (5) extend upwardly from the floor (1) to an elevation above that of the maximum headwater as at (6), and define the lateral boundaries of the device. The walls may be integral with an extension of the main dam structure (7) through which the fishway passes.

A median wall (8) is disposed between the walls (4) and (5) at its upstream end and extends for a short distance downstream as to (9).

It is to be understood that the use of a median wall or walls does not constitute a necessary part of this invention; the use of such a structure may be desirable when uninterrupted use of the fishway is required, such construction permitting a portion of the fishway to be dammed off temporarily for inspection and repair.

Vertical aligned grooves (10) are provided in the walls (4) and (5) and in the median wall (8) at the upstream end of the fishway. A plurality of emergency stop logs (11) are adapted for placement in the aligned grooves (10) to provide means whereby the flow of water through the fishway may be stopped. The grooves (10) are preferably flared at their uppermost ends to facilitate the introduction thereinto of the stop logs (11).

Vertical aligned grooves (13) are disposed in the vertical walls (4), (5) and (8). Regulating gates (12) are freely suspended in the grooves (13) so as to transversely span the fishway. Suitable mechanisms as motor drives (17) are arranged to actuate the regulating gates (12) as through chains (16), which are trained over suitable drive sprockets. Suitable counterweights (14) may be provided, attached to the free ends of chains (16). To prevent leaping fish from possible injury against the chains in passing through the fishway, recesses (15) may be provided for the chains and counterweights.

Vertical aligned grooves (19) are located in the walls (4), (5) and (8), and are positioned adjacent to the grooves (13). A plurality of stacked segmental gate units (18) are disposed in grooves (19), and arranged substantially parallel to and contiguous with the regulating gates (12). The segmental gate units are preferably each of a height somewhat less than that of the regulating gates (12), and are freely movable vertically in grooves (19). The height to which these segmental gate units are stacked is dependent upon the headwater elevation. The structure recited in this and in the preceding paragraph constitutes in effect the upstream weir of the fish ladder structure of the fishway.

Correspondingly, vertical aligned grooves (13a) are disposed in the vertical walls (4), (5) and (8). Regulating gates (12a) are freely suspended in the grooves (13a) so as to transversely span the fishway. Suitable mechanisms as motor drives (17a) are arranged to actuate the regulating gates (12a) as through chains (16a), which are trained over suitable drive sprockets. Suitable counterweights (14a) may be provided, attached to the free ends of chains (16a), and operating in recesses (15a).

Vertical aligned grooves (19a) are located in the walls (4), (5) and (8), and are positioned adjacent to the groove (13a). A plurality of stacked segmental gate units (18a), is disposed in grooves (19a), and arranged substantially parallel and contiguous with the regulating gates (12a). The segmental gate units are preferably each of a height somewhat less than that of the regulating gates, and are freely movable vertically in grooves (19a). The height to which these segmental gate units are stacked is dependent upon water level elevation in pool (26). The structure recited in this and in the preceding paragraph constitutes in effect the next to the upstream weir of the fish ladder structure of the fishway. The structure of median wall (8) need not extend downstream further than sufficient to support grooves (19a).

Downstream from the median wall (8) a plurality of piers (20), (20a), may be vertically erected from the floor (1) of the fishway. Beams (21), (21a) serve to support the upper ends of the piers and to tie them in with the side walls (4) and (5), as well as to provide walkways. Vertical aligned grooved members (22), (22a) are affixed to walls (4) and (5) and to the piers (20), (20a). Stop log weirs (23), (23a) are disposed in the grooved members (22), (22a).

Downstream from the structure recited above the fishway comprises a series of pools (25), (25a), (25b), etc., arranged on a suitable hydraulic gradient. Dividing walls (24), (24a), (24b), (24c), etc., separate adjacent pools and are provided along their upper edges with adjustable weirs for controlling the depth of the pools (25), (25a), (25b), etc.

It is believed from the description heretofore given that a clear understanding may be had of the structure and of the assembly of the apparatus constituting the present invention. The operation of the apparatus as a whole is as hereinafter described.

Figure 4:
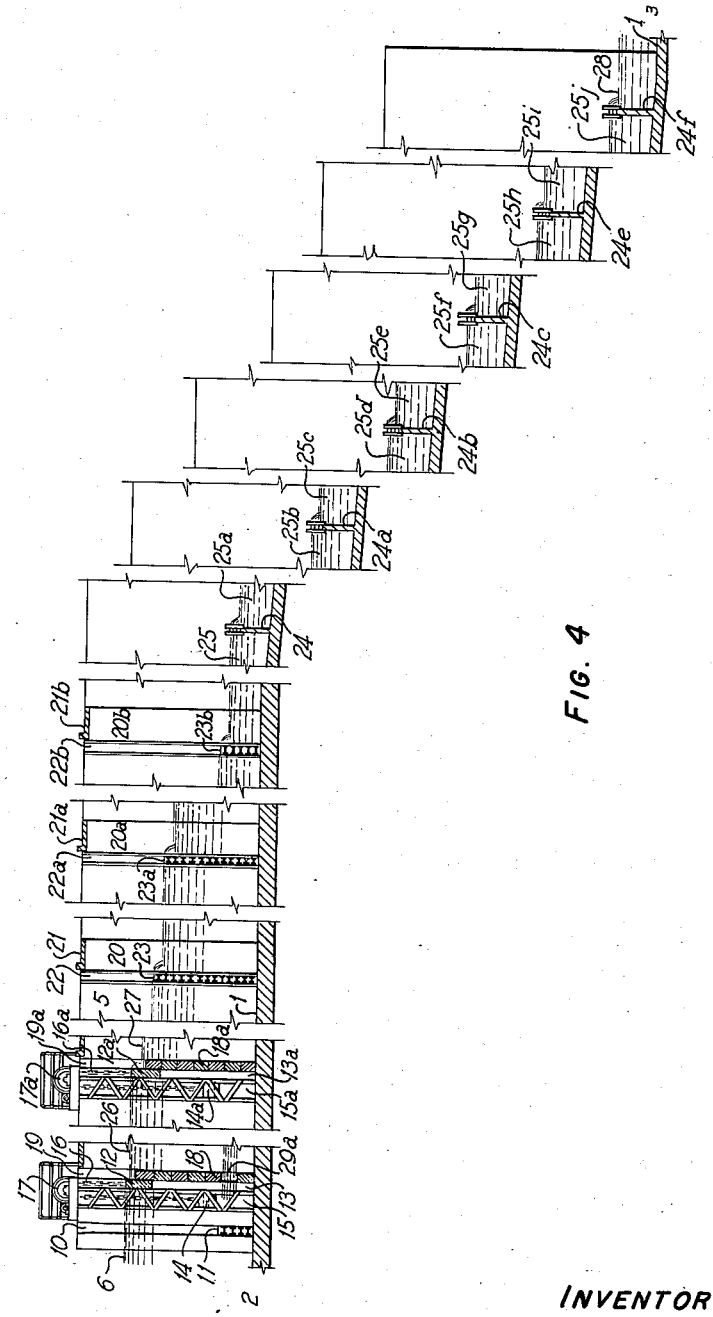
Figure 4 is a fragmentary sectional elevation of a fishway embodying the invention.

Let it be assumed that the elevation of the headwater level is as shown at (6) in Figure 4. A few emergency stop logs (11) are shown in position, retained by grooves (10). Ordinarily the emergency stop logs are all removed from across the fishway. The purpose of the emergency stop logs is to prevent the flow of water through the fishway to facilitate inspection, cleaning, and/or repairs, and to be effective the stack of stop logs must extend above the elevation of the headwater level (6). The emergency stop logs (11) may be maneuvered by any suitable means not here shown.

The segmental gate units (18) are stacked to a height somewhat below that of the headwater level (6) and the height of regulating gates (12) is adjusted as by the mechanism (17) to give a difference in elevation between the headwater level and the water level (26) on the downstream side of the regulating gates (12) such as to accommodate the migrating fish. This constitutes the final upstream step of the fish ladder.

Correspondingly, the segmental gate units (18a) are stacked to a height somewhat below the water level of the pool (26) and the regulating gates (12a) are adjusted as by the mechanism (17a) to give a difference in elevation between the water level (26) and the water level (27) on the downstream side of the regulating gates (12a). This constitutes the next to final upstream step of the fish ladder.

The segmental gate units (18), (18a) are manipulated by any suitable means not here shown.

The stop log weirs are stacked in position by any suitable means until such an elevation has been attained as will give a desired difference in elevation in the water levels of the pools formed on each side of the stop log weirs.

In general, small variations of forebay elevation can be compensated for by manipulation of the regulating gates (12), (12a). Should the forebay elevation vary by an amount greater than can be accommodated by the regulating gates (12), (12a), the height of the stack of segmental gate units (18), (18a), can be changed to meet the condition by the addition or removal of a suitable number of units. Extensive variations of the forebay elevation will require corresponding changes in the height of the stack of stop log weirs (23), (23a), (23b). Should the forebay elevation drop to the minimum, at which point the floor (1) would be submerged a distance just sufficient to permit the passage of fish thereover, the segmental gate units, (18), (18a), and stop log weirs, (23), (23a), (23b), would all be removed and the regulating gates (12), (12a), would be lifted clear of the water.

Figure 5:
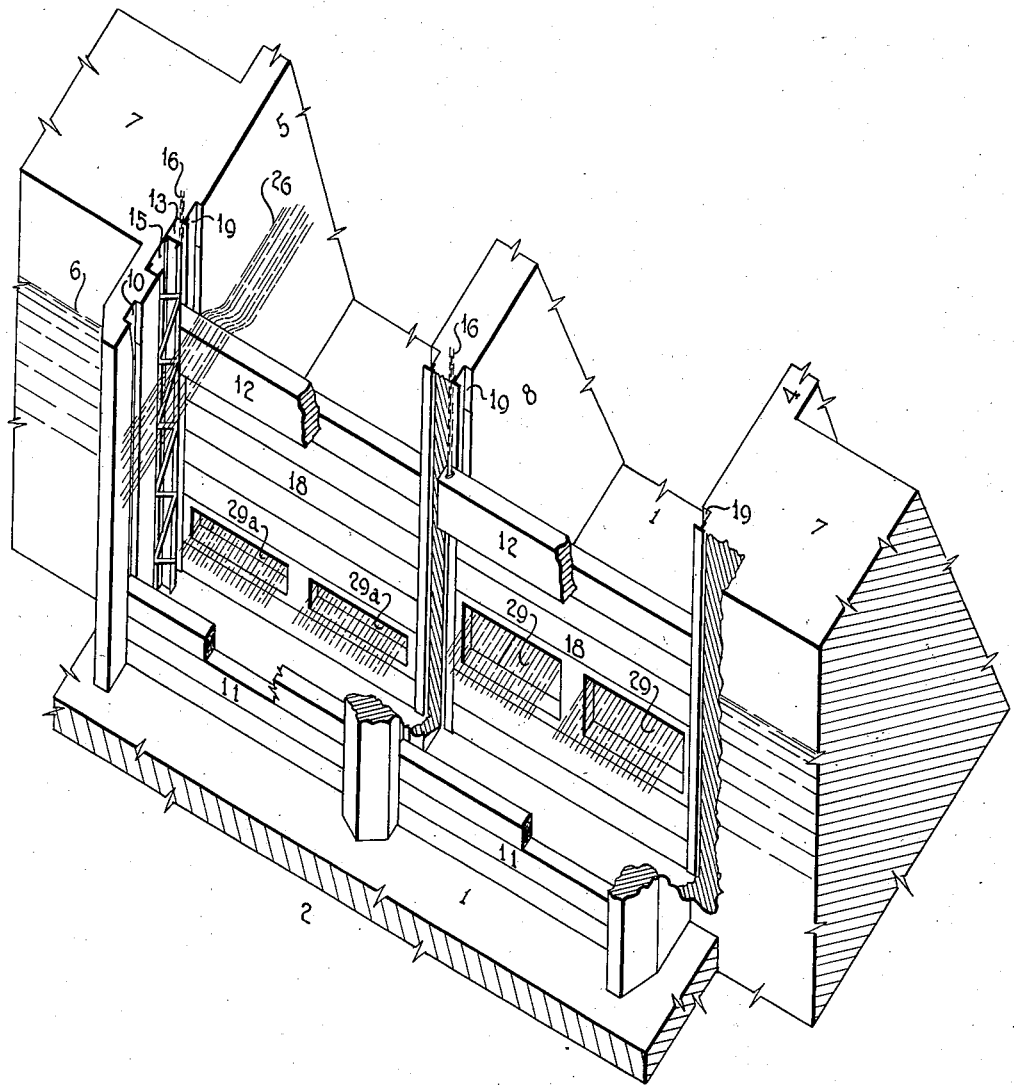
Figure 5 is a fragmentary oblique projection of a portion of the invention showing the use of apertured members to provide submerged openings through the segmental gates.

Under some circumstances it may be desirable to provide submerged apertures for the passage of certain varieties of fish through the fishway. Such submerged openings as (29), (29a), may be provided through any of the segmental gates and/or stop log weirs by the substitution of suitable apertured members as shown in Figure 5.

Preferably the upstream end (2) of the floor (1) of the fishway has an elevation somewhat less than the minimum headwater elevation and is preferably substantially level to facilitate the passage of the fish at times of low headwater; the level floor also facilitates inspection, repair and/or the removal of debris.

While the structure shown and described is the preferred embodiment of the invention, it is to be understood that the general structure, arrangement, and combination of parts may be altered by those skilled in the art without departing from the spirit of the invention as defined by the following claims.

Having described my invention, what I claim as new and wish to secure by Letters Patent is:

1. In a structure of the class described, a dam having a forebay and a tailrace, a fishway having a lower and an upper end and disposed about said dam, a portal disposed at the upper end of said fishway, a pair of upwardly extending substantially parallel walls flanking said portal, a pair of vertical aligned grooves disposed one in each of said walls, a second pair of vertical aligned grooves disposed one in each of said walls and adjacent to the first named pair of grooves, a plurality of stacked segmental gate units disposed in one of said pairs of grooves, and a regulating gate disposed in the other one of said pairs of grooves.

2. In a structure of the class described, a dam having a forebay and a tailrace, a fishway having a lower and an upper end and disposed about said dam, a portal disposed at the upper end of said fishway, a pair of upwardly extending walls flanking said portal, a pair of vertical aligned grooves disposed one in each of said walls, a second pair of vertical aligned grooves disposed one in each of said walls and adjacent to the first named pair of grooves, a plurality of stacked segmental gate units disposed in one of said pairs of grooves, a regulating gate disposed in the other one of said pairs of grooves, shielded counterpoise means coacting with said regulating gate, and power means for actuating said regulating gate.

3. In a structure of the class described, a dam having a forebay and a tailrace, a fishway having a lower and an upper end and disposed about said dam, a portal disposed at the upper end of said fishway, a pair of upwardly extending walls flanking said portal, a plurality of pairs of spaced vertical aligned grooves disposed one of each pair in each of said walls, a second plurality of pairs of vertical aligned grooves disposed one of each pair in each of said walls and adjacent to the first named grooves, a plurality of segmental gate units disposed in a plurality of stacks in one set of said plurality of pairs of grooves, a plurality of regulating gates disposed one in each of the remaining pairs of grooves, shielded counterpoise means coacting with said regulating gates and power means for actuating said regulating gates, and an adjustable weir disposed within said portal in advance of said segmental gates.

4. In combination with a dam having a forebay and a tailrace, a fishway effecting open communication between the forebay and the tailrace, a portal disposed at the forebay end of the fishway, a substantially level floor disposed at said portal and extending some distance toward the tailrace end of the fishway, a pair of walls flanking the said portal and extending upwardly from said floor, spaced pairs of adjacent grooves vertically disposed in one of said walls, complementary spaced pairs of grooves disposed in the other one of said walls and in transverse alignment with the first named spaced pairs of grooves, a plurality of spaced segmental gates disposed one each in each of said pairs of grooves and complementary pairs of grooves, a plurality of regulating gates disposed one each in one each of the remaining grooves and complementary grooves, means for counterpoising the regulating gates, power means for actuating the regulating gates, and an adjustable weir spaced beyond the segmental gates.

BEN L. PETERSON.